United States Patent
Sugumar

(10) Patent No.: US 11,663,130 B1
(45) Date of Patent: May 30, 2023

(54) CACHE REPLACEMENT MECHANISMS FOR SPECULATIVE EXECUTION

(71) Applicant: Marvell Asia Pte Ltd, Singapore (SG)

(72) Inventor: Rabin Sugumar, Sunnyvale, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 17/245,254

(22) Filed: Apr. 30, 2021

Related U.S. Application Data

(60) Provisional application No. 63/124,546, filed on Dec. 11, 2020.

(51) Int. Cl.
  *G06F 12/08* (2016.01)
  *G06F 12/0862* (2016.01)
  *G06F 12/121* (2016.01)

(52) U.S. Cl.
  CPC ........ *G06F 12/0862* (2013.01); *G06F 12/121* (2013.01); *G06F 2212/60* (2013.01); *G06F 2212/602* (2013.01); *G06F 2212/6022* (2013.01); *G06F 2212/6024* (2013.01);
  (Continued)

(58) Field of Classification Search
  CPC ............. G06F 12/0862; G06F 12/0871; G06F 9/30043; G06F 9/30047; G06F 9/3042; G06F 9/3044; G06F 9/3046; G06F 2212/602; G06F 2212/6022; G06F 9/384; G06F 12/12; G06F 2212/507; G06F 9/3842; G06F 9/3844; G06F 9/3846; G06F 9/3848; G06F 2212/6024; G06F 2212/6026; G06F 2212/6028; G06F 12/14; H04L 9/002; H04L 9/005
  See application file for complete search history.

(56) References Cited

U.S. PATENT DOCUMENTS 7,660,969 B2 * 2/2010 Jensen ................... G06F 9/3857
  712/214
7,779,307 B1 * 8/2010 Favor ................... G06F 11/1407
  714/45

(Continued)

OTHER PUBLICATIONS

Integer operations vs floating point operations by Georgaidis (Year: 2018).*

(Continued)

*Primary Examiner* — Paul M Knight
(74) *Attorney, Agent, or Firm* — Young Basile Hanlon & MacFarlane, P.C.

(57) ABSTRACT

Described herein are systems and methods for cache replacement mechanisms for speculative execution. For example, some systems include, a buffer comprising entries that are each configured to store a cache line of data and a tag that includes an indication of a status of the cache line stored in the entry, in an integrated circuit that is configured to: responsive to a cache miss caused by a load instruction that is speculatively executed by a processor pipeline, load a cache line of data corresponding to the cache miss into a first entry of the buffer and update the tag of the first entry to indicate the status is speculative; responsive to the load instruction being retired by the processor pipeline, update the tag to indicate the status is validated; and, responsive to the load instruction being flushed from the processor pipeline, update the tag to indicate the status is cancelled.

19 Claims, 8 Drawing Sheets

(52) U.S. Cl.
CPC ............... *G06F 2212/6026* (2013.01); *G06F 2212/6028* (2013.01)

(56) References Cited

U.S. PATENT DOCUMENTS

| | | | |
|---|---|---|---|
| 2002/0062426 A1* | 5/2002 | Gomez | G06F 9/3842 |
| | | | 712/E9.05 |
| 2004/0162951 A1* | 8/2004 | Jacobson | G06F 9/3834 |
| | | | 711/158 |
| 2020/0042066 A1* | 2/2020 | Li | G06F 11/1451 |
| 2020/0042732 A1* | 2/2020 | Nair | G06F 12/0802 |
| 2020/0192805 A1* | 6/2020 | Keymolen | G06F 3/0647 |
| 2021/0064541 A1* | 3/2021 | Kothinti Naresh | G06F 12/12 |
| 2021/0373889 A1* | 12/2021 | Cai | G06F 12/1027 |

OTHER PUBLICATIONS

MuonTrap: Preventing Cross-Domain Spectre-Like Attacks by Capturing Speculative State by Ainsworth (Apr. 2020) (Year: 2020).*
Amazon Engineer's Patch for Flushing L1 Cache on Context Switching Revved by Larabel (Year: 2020).*
A Journey Through the CPU Pipeline by Wagstaff (Year: 2013).*
MuonTrap: Preventing Cross-Domain Spectre-Like Attacks by Capturing Speculative State by Ainsworth (Year: 2020).*

\* cited by examiner

CACHE REPLACEMENT MECHANISMS FOR SPECULATIVE EXECUTION

CROSS-REFERENCE TO RELATED APPLICATION(S)

This application claims priority to and the benefit of U.S. Provisional Application Patent Ser. No. 63/124,546, filed Dec. 11, 2020, the entire disclosure of which is hereby incorporated by reference.

TECHNICAL FIELD

This disclosure relates to cache replacement mechanisms for speculative execution (e.g., for mitigating side-channel attacks).

BACKGROUND

A processor pipeline includes multiple stages through which instructions advance, a cycle at a time. In a scalar processor, instructions proceed one-by-one through the pipeline, with at most a single instruction being committed per cycle. In a superscalar processor, multiple instructions may proceed through the same pipeline stage at the same time, allowing more than one instruction to issue per cycle, depending on certain conditions (called hazards), up to an issue width. Some processors issue instructions in-order (according to a program order), with consecutive instructions proceeding through the pipeline in program order. Other processors allow instructions to be reordered and issued out-of-order, which potentially increases overall pipeline throughput. If reordering is allowed, instructions can be reordered within a sliding instruction window (whose size can be larger than the issue width), and a reorder buffer can be used to temporarily store results (and other information) associated with instructions in the instruction window to enable the instructions to be committed in-order (potentially allowing multiple instructions to be committed in the same cycle as long as they are contiguous in the program order).

In the last few years, cache side-channel attacks have emerged as a way for malicious agents to steal confidential information from computer systems by exploiting speculative execution behavior of modern central processing units. There are many variants (e.g., Spectre 1 and Spectre 2), but in its essence a malicious agent takes control of speculative execution in a privileged context (e.g. running the operating system) for instance by programming the branch predictor while in a non-privileged context (e.g. running user applications). The malicious agent then forces the central processing unit to do certain actions in speculative mode by setting up the target program counter to be at a useful code location and by setting up registers as needed prior to going into the privileged context. Since it is speculative, and most actions done during speculation are thrown away, this was viewed as harmless and central processing units did not block such behavior. However, though most speculative actions are thrown away at the end of speculation when it is determined that the path taken was incorrect, cache modifications that were done during speculation may be persistent. The malicious agent checks the state of the cache when control returns to non-privileged context, and from the state of the cache the malicious agent can determine secret information.

SUMMARY

Disclosed herein are implementations of cache replacement mechanisms for speculative execution.

A first aspect of the disclosed implementations is an integrated circuit for executing instructions, comprising: a processor pipeline configured to access memory through a cache; and a buffer comprising entries that are each configured to store a cache line of data and a tag that includes an indication of a status of the cache line stored in the entry, wherein the status can take values from a set that includes speculative, validated, and cancelled; in which the integrated circuit is configured to: responsive to a cache miss caused by a first load instruction that is speculatively executed by the processor pipeline, load a cache line of data corresponding to the cache miss into a first entry of the buffer and update the tag of the first entry to indicate the status is speculative; responsive to the first load instruction being retired by the processor pipeline, update the tag of the first entry to indicate the status is validated; and, responsive to the first load instruction being flushed from the processor pipeline, update the tag of the first entry to indicate the status is cancelled.

A second aspect of the disclosed implementations is method that includes: responsive to a cache miss caused by a first load instruction that is speculatively executed by a processor pipeline, loading a cache line of data corresponding to the cache miss into a first entry of a buffer and updating a tag of the first entry to indicate a status is speculative; and, responsive to the first load instruction being retired by the processor pipeline, updating the tag of the first entry to indicate the status is validated.

A third aspect of the disclosed implementations is method that includes: responsive to a cache miss caused by a first load instruction that is speculatively executed by a processor pipeline, loading a cache line of data corresponding to the cache miss into a first entry of a buffer and update a tag of the first entry to indicate a status is speculative; and, responsive to the first load instruction being flushed from the processor pipeline, updating the tag of the first entry to indicate the status is cancelled.

A fourth aspect of the disclosed implementations is an integrated circuit for executing instructions, comprising: means for caching data to provide access to a memory; means for processing data, including accessing the memory from a processor pipeline through the means for caching data; and means for buffering data in a plurality of entries that are each configured to store a cache line of data and a tag that includes an indication of a status of the cache line stored in the entry, wherein the status can take values from a set that includes speculative, validated, and cancelled; in which the processing comprises: responsive to a cache miss caused by a first load instruction that is speculatively executed by the processor pipeline, loading a cache line of data corresponding to the cache miss into a first entry of the plurality of entries and update the tag of the first entry to indicate the status is speculative; responsive to the first load instruction being retired by the processor pipeline, updating the tag of the first entry to indicate the status is validated; and, responsive to the first load instruction being flushed from the processor pipeline, updating the tag of the first entry to indicate the status is cancelled.

These and other aspects of this disclosure are disclosed in the following detailed description of the implementations, the appended claims and the accompanying figures.

BRIEF DESCRIPTION OF THE DRAWINGS

The disclosure is best understood from the following detailed description when read in conjunction with the accompanying drawings, wherein like reference numerals refer to like parts throughout the several views. It is emphasized that, according to common practice, the various features of the drawings are not to-scale. On the contrary, the dimensions of the various features are arbitrarily expanded or reduced for clarity.

DETAILED DESCRIPTION

Described herein are systems and methods for cache replacement mechanisms for speculative execution. These mechanisms may avoid speculative change of cache state with little or no performance impact. Implementations may temporarily store data that a processor pipeline tries to access via a cache in buffer during speculative execution of a load instruction to avoid updating of the cache based on cache misses caused by load instructions that are speculatively executed by a processor pipeline before the load instructions have been retired. These mechanisms may prevent or mitigate certain side-channel attacks that exploit a leak of information between processes through cache updates.

In some central processing units, load instructions check caches for presence of data and bring data in from memory when caches do not have the referenced data. Cache check and fill are done regardless of whether execution is speculative or not, which can contribute to potential vulnerabilities.

Figure 4:
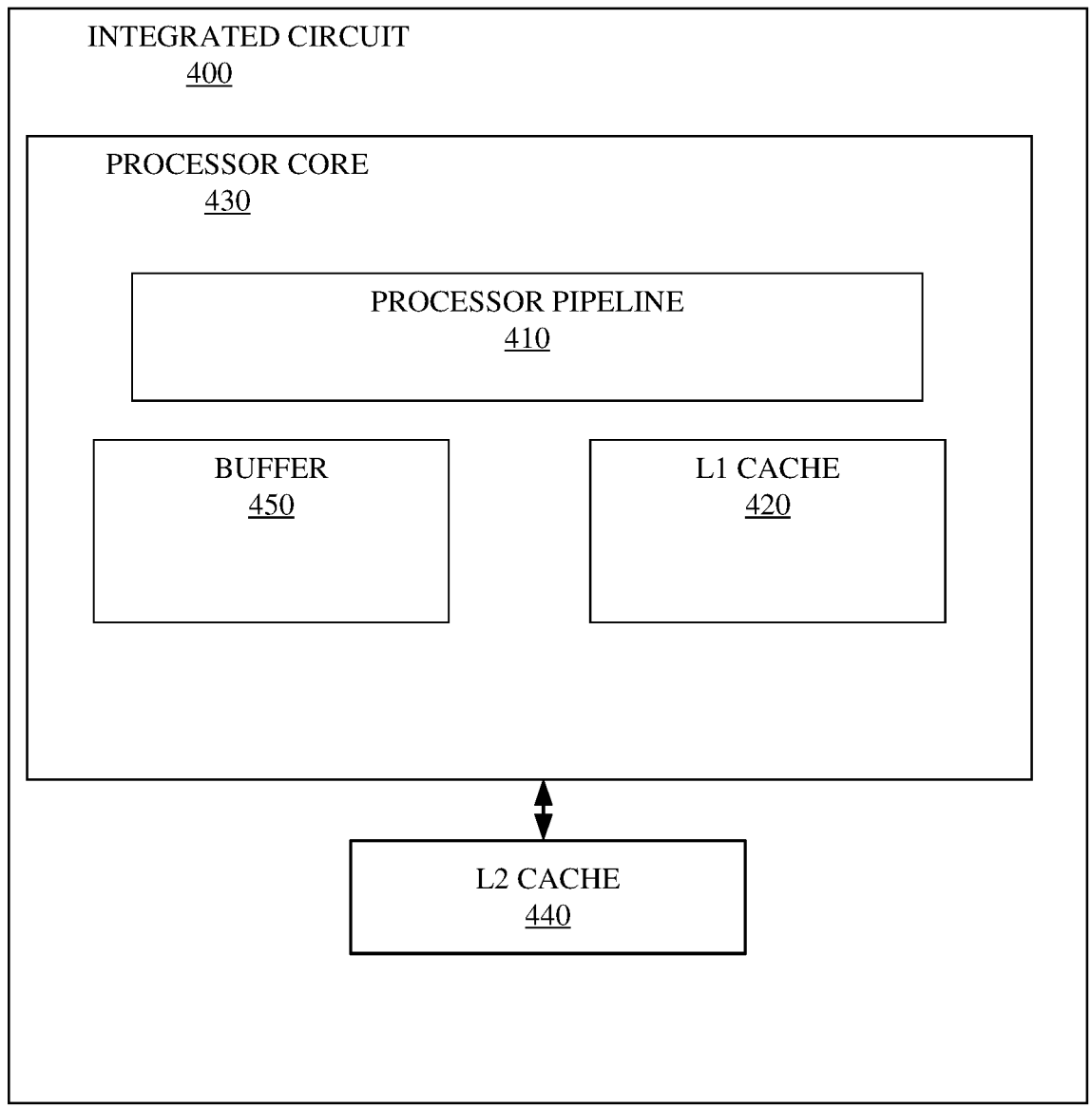
FIG. 4 is a block diagram of an example of an integrated circuit for executing instructions with cache replacement mechanisms for speculative execution.
Figure 5:
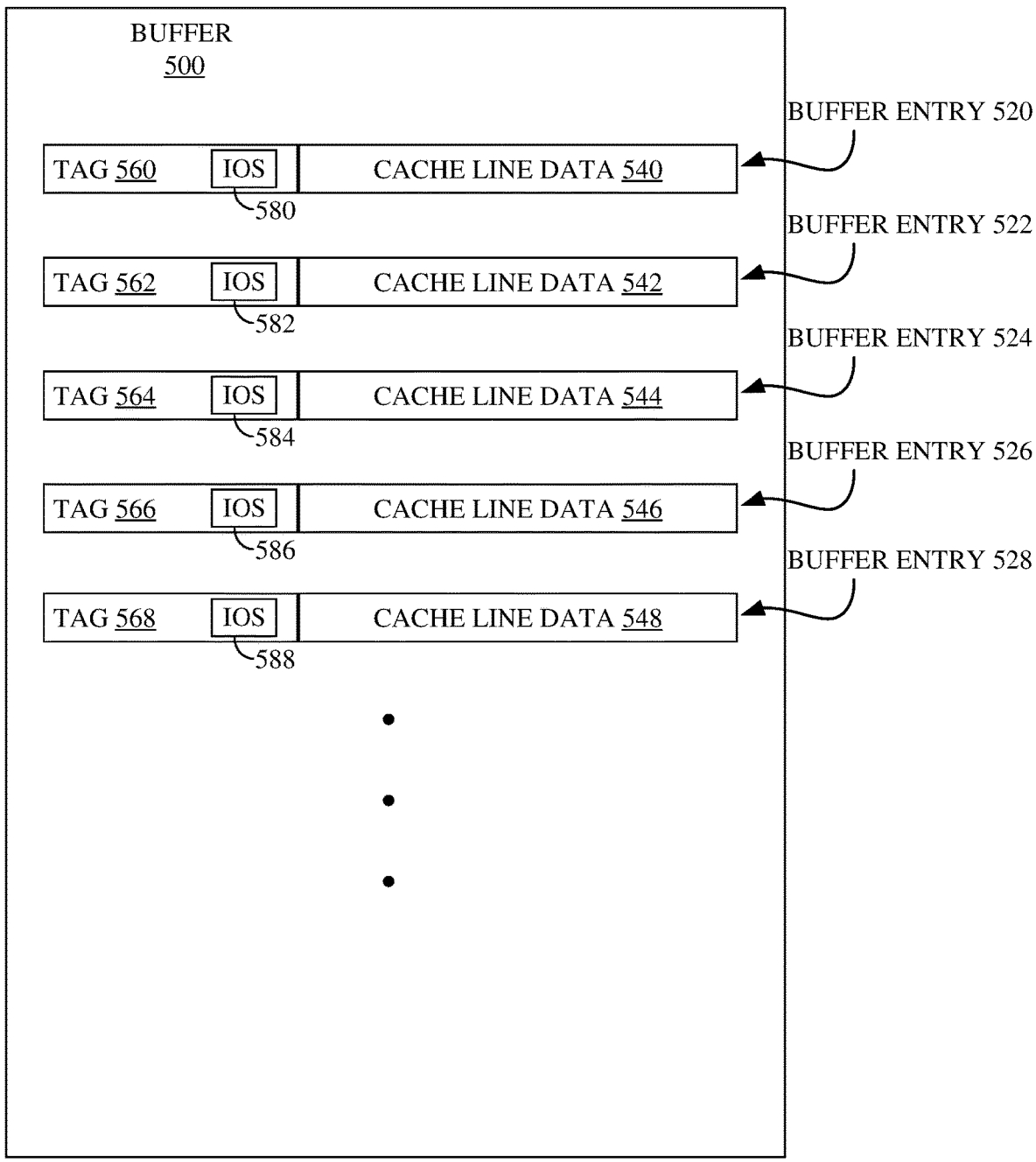
FIG. 5 is a block diagram of an example of a buffer for storing cache lines of data during speculative execution to delay updates to a cache.

A new structure is proposed herein including a buffer (e.g., a speculative fill buffer) for storing cache lines of data while the instruction that pulled them from the memory system is still being executed speculatively. FIG. 4 shows example of where the buffer may be located relative to a processor pipeline (e.g., next to the first level data cache). The buffer may be checked concurrent with the first level data cache during execution. FIG. 5 shows an example of the basic structure of the buffer. The buffer includes several entries, where each entry has a tag and an associated data store for holding an entire cache line. When a load that is executed speculatively misses in the data cache and in the buffer, an entry is allocated for it in the buffer and the entry is marked as speculative. When data for the load returns from memory or another cache level it does not go into the data cache, but instead goes into the allocated entry in the buffer.

Two actions may be performed for such loads that are executed speculatively. In a first case, the load is determined to be on the right path and is retired and committed to architectural state. In that case the entry in the buffer for the load is marked valid. In some implementations, a separate state machine may be used to walk the buffer periodically to move data marked valid into the cache. In a second case, the load is determined to be on the wrong path and is cancelled (e.g., when a pipeline flush occurs upon determination of a branch misprediction). In the second case, the entry in the buffer is marked cancelled, and corresponding data is discarded. Consequently, speculative loads do not impact cache state and there is no residual cache state that a malicious agent is able to inspect to determine secrets.

Load instructions check the buffer as well as caches—when the required data is available in the buffer in a speculative or valid state, load instructions may use the data and do not send a request to memory. When multiple speculative loads hit an entry in the buffer, the entry continues to be associated with the first speculative load. If the first speculative load is committed, the data should move into cache, and if the first speculative load is not committed then later speculative loads will also be cancelled and the data may be discarded. In some implementations, this new buffer participates in all cache coherence activity.

Many central processing units today have multiple levels of caches. The new buffer may be placed with the cache closest to a processor pipeline (e.g., a Level 1 cache in many designs as shown in FIG. 4). When a cache fill is triggered from the buffer, data may be written to both the Level 1 cache and the Level 2 cache and other levels of cache if they exist. In some implementations, the buffer is used to avoid speculatively updating the Level 1 cache. In some implementations, none of the caches are speculatively updated.

The new buffer may be a fully associative structure. In many usage scenarios it doesn't have to be too deep. For example, a 32 entry structure might be sufficient. When the buffer overflows old entries may be discarded regardless of state without affecting functionality though it is preferrable that entries marked valid are not discarded. Alternately, the buffer could be a set associative structure as well. The buffer could also be arranged in any of a variety of ways. For example, the buffer can be provided as a sub-buffer or a portion of buffer circuitry, or the buffer can be included within another buffer that also includes entries for other purposes. The bovver can include entries that are arranged as a contiguous set of entries (e.g., associated with each other based on predetermined region within the buffer circuitry), or entries that are arranged as non-contiguous sets of entries (e.g., associated with each other using pointers or other means of tracking the locations of the entries).

Not all loads need to fill into the buffer. Depending on the architecture, certain loads may be allowed to directly fill cache. For example, most known attacks do not use loads to floating point or single instruction multiple data (SIMD) registers and such loads may be allowed to directly fill the cache. In addition, since attacks are on privileged contexts it may be okay to allow loads executing in the lowest privilege context to directly fill cache. Such optimizations may allow the buffer to be a smaller structure without performance impact.

Many processor designs issue hardware or software prefetches based on speculative loads. Prefetches that are associated with a speculative load may also go into the buffer. When the load retires and is committed, the prefetches are marked valid, similar to load data, and moved into cache over time. When the load is on a wrong path and discarded, the associated prefetched data may be discarded as well. In some processor designs prefetches may just go into the Level 2 cache. In such processor designs a separate instance of the buffer associated with the Level 2 cache for prefetches may be used.

In many processor designs, stores are not executed speculatively. In such designs, stores do not interact with the buffer. However, certain processor designs convert speculative stores into prefetches to bring data into a central processing unit for quick completion of the store later. Such speculative store prefetches may go into the buffer as well and may then be validated or discarded based on the disposition of the store.

The systems and techniques described herein may provide advantages over conventional systems and techniques, such as, for example, preventing or mitigating side-channel attacks that exploit speculative cache updates. Some implementations may improve security with little or no impact on processor performance.

Figure 1:
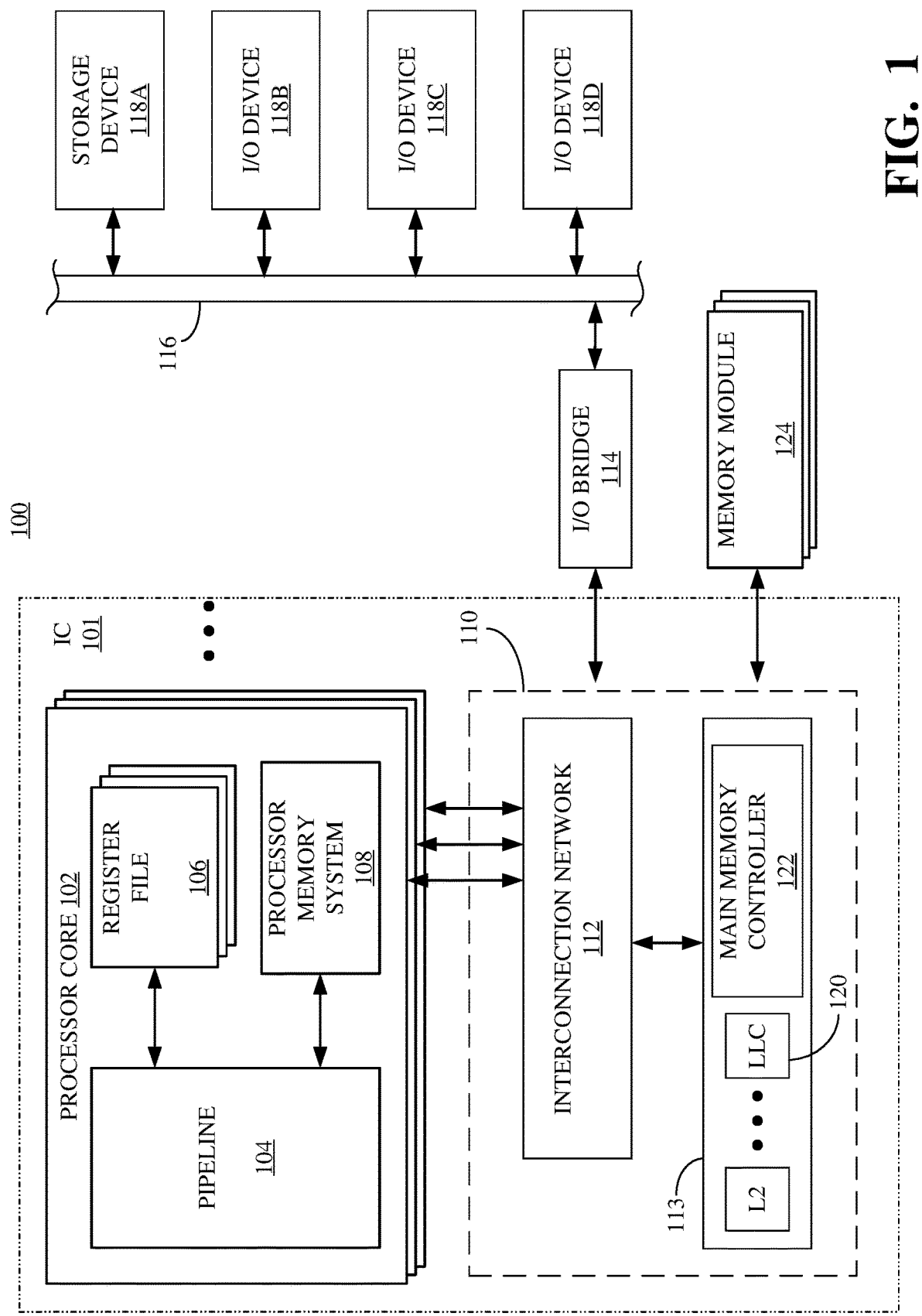
FIG. 1 is a high-level block diagram of an example of a computing system 100.
Figure 2:
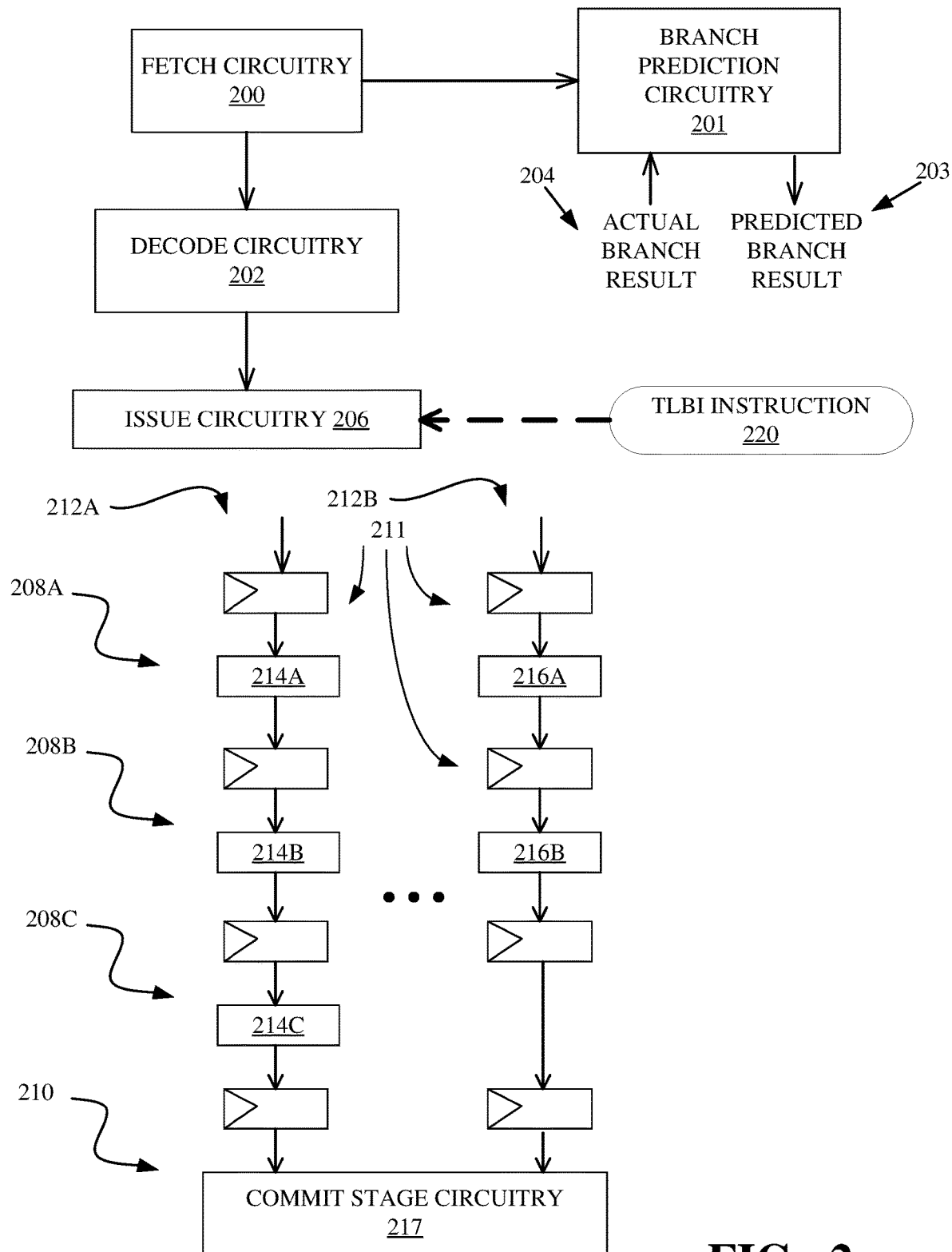
FIG. 2 is an example of a configuration of the pipeline of FIG. 1.
Figure 3:
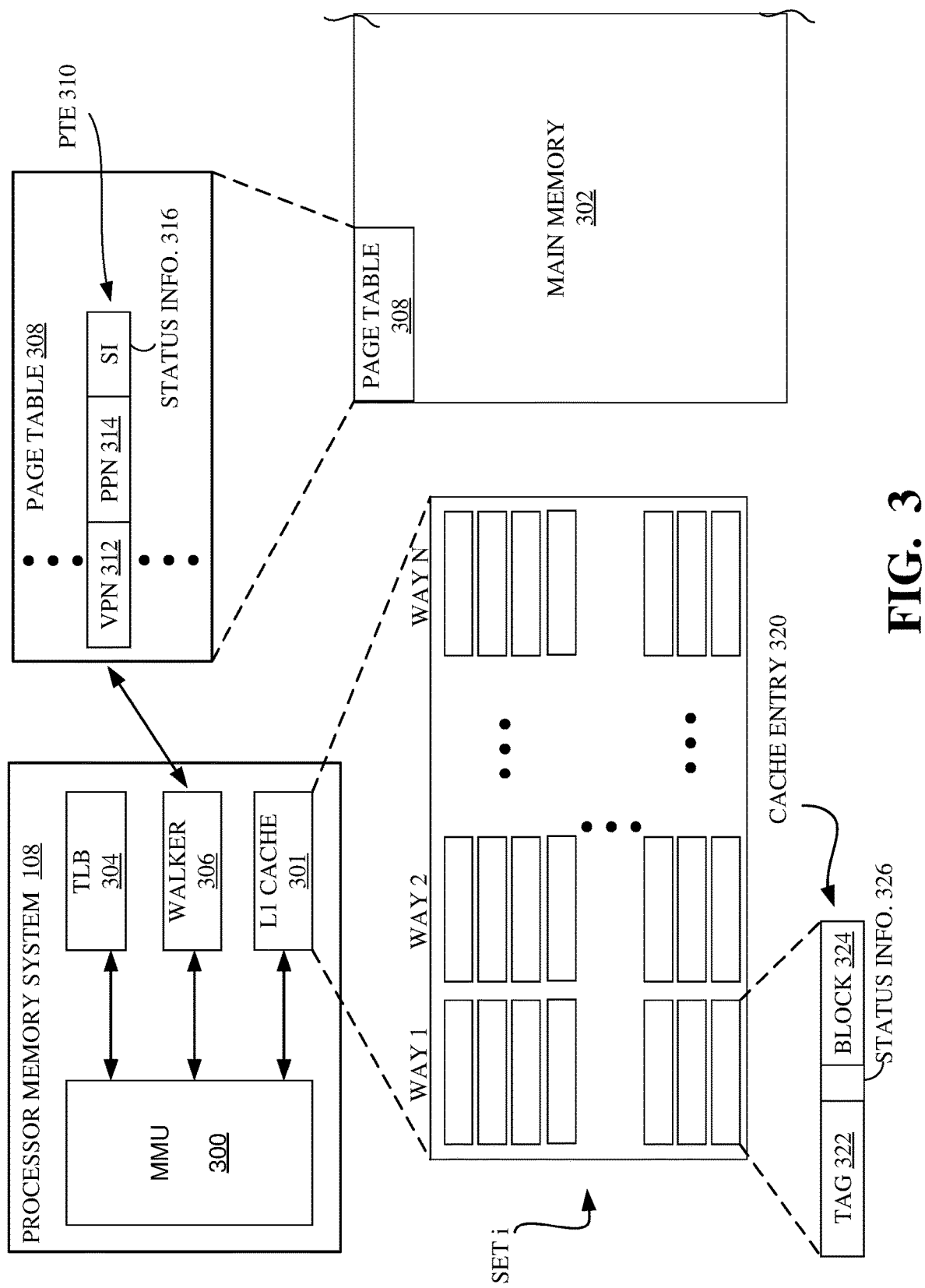
FIG. 3 is an example of a configuration of the processor memory system of FIG. 1.

Further details of techniques for cache replacement mechanisms for speculative execution are described herein with initial reference to a system in which they can be implemented, as shown in FIGS. 1 through 3.

FIG. 1 is a high-level block diagram of an example of a computing system 100. The computing system 100 includes an integrated circuit 101 with at least one processor core 102, which can be a single central processing unit (CPU) or one of multiple processor cores in a multi-core architecture. In a multi-core architecture each processor core (or simply "core") can include an individual CPU with associated circuitry. In this example of a multi-core architecture, each processor core 102 can include a processor pipeline 104, one or more register files 106, and a processor memory system 108. Each register file of the register files 106 can include one or more individually addressable registers. The integrated circuit 101 may be configured with cache replacement mechanisms for speculative execution for mitigation of side-channel attacks. For example, the processor memory system 108 may include the buffer 450 of FIG. 4 for temporarily storing the cache data lines during speculative execution of load instructions. For example, the integrated circuit 101 may be used to implement the technique 600 of FIG. 6, the technique 700 of FIG. 7, and/or the technique 800 of FIG. 8.

Each processor core 102 can be connected to an uncore 110. The uncore 110 can include an interconnection network 112 and an external memory system 113. The interconnection network 112 can be a bus, a cross-bar switch, a mesh network, or some other interconnection network. The interconnection network 112 can enable communication between each processor core 102 and an external memory system 113 and/or an input/output (I/O) bridge 114.

The I/O bridge 114 can enable communication, such as over an I/O bus 116, with various different I/O devices including a storage device 118A and other I/O devices 118B-118D. Non-limiting examples of the other I/O devices 118B-118D can include a network interface, a display adapter, or user input devices such as a keyboard or a mouse.

The storage device 118A can be a disk drive or some other large capacity storage device. The storage device 118A can typically be a non-volatile storage device. In some examples, the storage device 118A, or a portion thereof, can be used in a virtual memory scheme. For example, a portion of the storage device 118A can serve as secondary storage (or a 'backing store') in a virtual memory scheme for the (typically volatile and/or capacity-limited) main memory. Examples of main memory include the processor memory system 108 or an external memory system, such as described below with respect to an external memory system 113.

The processor memory system 108 and the external memory system 113 together form a hierarchical memory system. The hierarchy can include any number of levels. The levels may be denoted or referred to as L1, L2, . . . , LN. The L1 level is a lower level memory than the L2 memory system, which in turn is a lower level than the L2 memory system, and so on. Typically, each level of the hierarchical memory system can include memory (e.g., a memory system) that is slower to access than that of the immediately lower level and/or each level of the hierarchical memory system can include memory (e.g., a memory system) that is faster to access, more limited in capacity, and/or more expensive than that of a higher level. Each level of the hierarchical memory system can serve as a cache.

A first level (L1) cache can be within (e.g., a part of) the processor memory system 108. Any number of higher level (L2, L3, . . . ) caches can be within the external memory system 113. The highest (i.e., last) level cache within the external memory system 113 can be referred to as the last level cache (LLC). In an example, the LLC can be the L2 cache.

At each level, the cache can include a first module that provides an instruction cache for caching instructions and a second module that provides a data cache for caching data. The memory system of a level of the hierarchical memory system can load blocks of instructions or data into entries and evict (e.g., removes, over-writes, etc.) blocks of instructions or data from entries in units of cache blocks (also called cache lines). Cache lines are further described with respect to FIG. 3.

In addition to the L1 instruction cache and data cache, the processor memory system 108 can include a translation lookaside buffer (TLB) for caching recent translations, and various other circuitry for handling a miss in the L1 instruction or data caches or in the TLB. For example, that circuitry in the processor memory system 108 of a processor core 102 can include a write buffer for temporarily holding values to be written from a store instruction being executed within the pipeline 104. The TLB is further described with respect to FIG. 3.

As already mentioned, the highest level cache within the external memory system 113 is the LLC (such as an LLC 120). The LLC 120 can be accessed (e.g., searched, etc.) just before main memory. Of course, this is only an example. The exact division between which level caches are within the processor memory system 108 and which are in the external memory system 113 can be different in other examples. For example, the L1 cache and the L2 cache can both be internal to the processor core 102 (i.e., part of the processor memory system 108) and the L3 (and higher) caches can be external to the processor core 102.

In an example, each processor core 102 can have its own internal L1 cache, and the processor cores can share an L2 cache. The external memory system 113 can also include a main memory controller 122. The main memory controller 122 can be connected to any number of memory modules 124. Each of the memory modules 124 can serve as (e.g., can be) the main memory. In a non-limiting example, one or more of the memory modules 124 can be Dynamic Random Access Memory (DRAM) modules.

In a typical example, the content of a memory address is searched for in a level (e.g., L1) of the hierarchical memory system. If not found, then the next higher level (e.g., L2) is searched; and so on. Searching for a memory address amounts to answering the question: does this memory level of the hierarchical memory system include the content of the memory address? Or, alternatively, is the memory address cached in this memory of the hierarchical memory system?

That is, in a particular cache level of the hierarchy of the hierarchical memory system, each cache entry includes space for storing the data words of a particular memory block along with bits for determining whether a particular word from a memory block is present in that cache level (i.e., a 'hit') or not present in that cache level (i.e., a 'miss'). After a miss in one level, the cache system attempts to access (i.e., read or write) the memory block from a higher level cache, or from the main memory (in the case of a miss in the LLC).

The pipeline 104 can include multiple stages through which instructions advance, a cycle at a time. The stages can include an instruction fetch (IF) stage or stages, an instruction decode (ID) stage or stages, an operand fetch (OF) stage or stages, an instruction execution (IE) stage or stages, and/or a write back (WB) stage or stages. The pipeline can include other stages, as further described with respect to FIG. 2. Some stages occur in a front-end portion of the pipeline. Some other stages occur in a back-end portion of the pipeline. The front-end portion can include pre-execution stages. The back-end portion of the pipeline can include execution and post-execution stages. The pipeline 104 is further described with respect to FIG. 2.

First, an instruction is fetched (e.g., in the IF stage or stages). An instruction can be fetched based on a program counter (PC). The PC is a pointer that can be used to identify instructions within memory (e.g., within a portion of the main memory, or within an instruction cache of the core 102). The PC can advance through addresses of a block of compiled instructions (called a "basic block"). The PC can be incremented by a particular number of bytes. The particular number of bytes for incrementing the PC can depend on how long (e.g., in bytes) each instruction is and on how many instructions are fetched at a time.

After being fetched, the instruction is then decoded (e.g., in the ID stage or stages) to determine an operation and one or more operands. Alternatively, in some pipelines, the IF and ID stages can overlap. If the instruction includes operands, the operands are fetched (e.g., in the OF stage or stages).

The instruction is then ready to be issued. Issuing an instruction starts progression of the instruction through stages in a back-end portion of the pipeline to execute the instruction. In an example, execution of the instruction can involve applying the operation of the instruction to the operand(s) to produce a result for an arithmetic logic unit (ALU) instruction. In an example, execution of the instruction can involve storing or loading to or from a memory address for a memory instruction. In an example, execution of the instruction can involve evaluating a condition of a conditional branch instruction to determine whether or not the branch should be taken.

After an instruction has completed execution, the instruction can be committed so that any effect of the instruction is made globally visible to software. Committing an instruction may involve storing a result in a register file (e.g., in the WB stage or stages), for example. In most implementations, even if any instructions were issued out-of-order, all instructions are generally committed in-order.

FIG. 2 is an example of a configuration of the pipeline 104 of FIG. 1.

The pipeline 104 can include circuitry for the various stages (e.g., the IF, ID, and OF stages). For one or more instruction fetch stages, an instruction fetch circuitry 200 provides a PC to an instruction cache in a processor memory system, such as the processor memory system 108 of FIG. 1, to fetch (e.g., retrieve, read, etc.) instructions to be fed (e.g., provided to, etc.) into the pipeline 104. For example, the PC can be a virtual address of the next instruction, in which case the PC can be incremented by the length of a virtual address in the case of sequential execution (i.e., without taking any branches). Virtual addresses are described with respect to FIG. 3.

The instruction fetch circuitry 200 can also provide the program counter, PC, to a branch prediction circuitry 201. The branch prediction circuitry 201 can be used to provide a predicted branch result 203 for branch instructions. The predicted branch result 203 enables the pipeline 104 to continue executing speculatively while an actual branch result 205 is being determined. The branch prediction circuitry 201 can also store branch history information that is updated based on receiving the actual branch result 204. In some implementations, some or all of the branch prediction circuitry 201 can be considered to be a part of the instruction fetch circuitry 200.

In an the out-of-order execution, for one or more instruction decode (ID) stages, instruction decode circuitry 202 can store information in an issue queue for instructions in an instruction window waiting to be issued. The issue queue (which can also be referred to as an instruction queue) is such that an instruction in the queue can leave the queue when the operands of the instruction become available. As such, the instruction can leave before earlier (e.g., older) instructions in a program being executed. The instruction window refers to a set of instructions that can execute out-of-order.

An issue circuitry 206 can determine a respective cycle in which each of the instructions in the issue queue are to be issued. Issuing an instruction makes the instruction available to progress through circuitry of instruction execution (IE) stages, such as a first execution stage 208A, a second execution stage 208B, and a third execution stage 208C, of the pipeline 104. For simplicity of explanation, only three execution stages are illustrated in FIG. 2. However, the disclosure herein is not so limited: more or fewer execution stages are possible.

The pipeline 104 can include one more commit stages, such as a commit stage 210. A commit stage commits (e.g., writes to memory) results of instructions that have made their way through the IE states 208A, 208B, and 208C. For example, a commit stage circuitry 217 may write back a result into a register file, such as the register file 106 of FIG. 1. However, some instructions may not be committed by the commit stage circuitry 217; Instead the results of the instructions may be committed by other circuitry, such as circuitry in another stage of the back-end or a stage of the front-end, possibly based on information from the commit stage.

Between adjacent stages of the pipeline 104, the various paths through the pipeline circuitry include pipeline registers. For example, shown in FIG. 2 are pipeline registers 211 for the IE stages 208A, 208B, and 208C. The pipeline registers can be used for storing results of an upstream stage to be passed downstream to a next stage. The pipeline registers 211 may be clocked by (i.e., receive a clock signal derived from) a common clock (not shown). Thus, each clock cycle, each pipeline register 211 (also called a latch, or a set of flip-flops) can pass a result from its input to its output and becomes ready to receive a new result in its input after that result has been produced by the circuitry of that stage.

There may be multiple separate paths through the IE stages. The IE stages can include various circuitry for executing different types of instructions. For illustration purposes, only two paths 208A and 208B are shown in FIG. 2. However, the execution stages can include any number of paths with corresponding circuitry, which can be separated by pipeline registers, such as the pipeline registers 211.

The number of paths through the instruction execution stages can generally be dependent on the specific architecture. In an example, enough paths can be included such that a number of instructions up to a maximum number of instructions that can progress through the same execution stages in the same cycles. The maximum number of instructions that can progress through the same execution stages in the same cycles can be referred to as the issue width.

The number of stages that include functional circuitry for a given path may also differ. In the example of FIG. 2, a first path 212A includes functional circuitry 214A, 214B, and 214C located in the first execution stage 208A, the second execution stage 208B, and the third execution stage 208C, respectively. The second path 212B includes functional circuitry 216A and 216B located in the first execution stage 208A and the second execution stage 208B, respectively. In the second path 212B, the third execution stage 208C is a "silo stage" that passes a result along without performing further computation thereby ensuring that each path passes through the same number of stages through the pipeline.

In an example, a path can include circuitry for executing instructions using units for various operations (e.g., ALU, multiplier, floating point unit, etc.). In an example, another path can include circuitry for executing memory access instructions. The memory access instructions can include load instructions that read data values from the memory system. The memory access instructions can include store instructions to write data values to the memory system. The circuitry for executing memory access instructions can also initiate translation of virtual addresses to physical addresses, when necessary, as described in more detail below with respect to FIG. 3.

In addition to branch prediction, as described with respect to the branch prediction circuitry 201, the pipeline 104 can be configured to perform other types of speculative execution. In an example of another type of speculative execution, the pipeline 104 can be configured to reduce the chance of stalling (such as in the event of a cache miss) by prefetching. Stalling refers to the situation in which processor execution of instructions is stopped/paused.

A prefetch request can be used to preload a cache level (e.g., of a data cache) so that a future memory request is likely to hit in that cache level instead of having to access a higher cache level or a main memory. For example, a speculative memory access request can include prefetch requests that are sent to preload an instruction cache or data cache based on a predicted access pattern.

A prefetch request can be or can include a software prefetch request such that an explicit prefetch instruction that is inserted into the pipeline 104 includes a particular address to be prefetched. A prefetch request can be or can include a hardware prefetch that is performed by hardware within the processor (e.g., the processor core 102) without an explicit prefetch instruction being inserted into its pipeline (e.g., the pipeline 104).

In some cases, prefetching can include recognizing a pattern (e.g., a stream) within the memory accesses of a program, or can include speculatively performing a load instruction within a program (e.g., using a speculative address for that load instruction) before that load instruction is actually issued as part of program execution.

Various types of external instructions can be received from other processor cores. Such externally received instructions can be inserted into the pipeline 104 by the issue circuitry 206 to be handled at the appropriate stage. An example of such an externally received instruction is a TLB invalidation (TLBI) instruction 220 for invalidating entries in the TLB of that particular processor core (i.e., the receiving core). Another example of an external instruction that can be received is a GlobalSync instruction, which may be broadcast to processor cores as a side effect of a memory barrier operation performed by a processor core to ensure that the effects of any previously broadcast TLBIs have been completed. Said another way, an originating processor core that issues a broadcast TLBI instruction can subsequently issue a data synchronization barrier (DSB) instruction, which in turn causes GlobalSync instructions to be received by every other processor core. In response to the GlobalSync instruction, when a receiving processor core completes the TLBI instruction, the receiving processor core sends, or causes to be sent, an acknowledgement to the originating process core. Once the originating process core receives acknowledgements from all receiving processor cores, the originating process core can proceed with instruction execution.

FIG. 3 is an example of a configuration of the processor memory system 108 of FIG. 1. In example illustrated in FIG. 3, the processor memory system 108 includes a memory management unit (MMU) 300 that manages access to the memory system. The MMU 300 can manage the translation of virtual addresses to physical addresses.

In some implementations, the MMU 300 can determine whether a copy of a stored value (e.g., data or an instruction) at a given virtual address is present in any of the levels of the hierarchical cache system, such as in any of the levels from an L1 cache 301 up to the LLC 120 (FIG. 1) if necessary. If so, then the instruction accessing that virtual address can be executed using a cached copy of the value associated with that address. If not, then that instruction can be handled by miss circuitry to be executed after accessing the value from a main memory 302.

The main memory 302, and potentially one or more levels of the cache system, may need to be accessed using a physical address (PA) translated from the virtual address (VA). To this end, the processor memory system 108 can include a TLB 304 that stores translations, defined by VA-to-PA mappings, and a page table walker 306 for accessing a page table 308 if a translation is not found in the TLB 304. The translations stored in the TLB can include recently accessed translations, likely to be accessed translations, some other types of translations, or a combination thereof.

The page table 308 can store entries, including a page table entry (PTE) 310, that contain all of the VA-to-PA mappings currently in use. The page table 308 can typically be stored in the main memory 302 along with physical memory pages that represent corresponding mapped virtual memory pages that have been "paged in" from secondary storage (e.g., the storage device 118A of FIG. 1).

A memory page can include a number of cache blocks. A cache block can include a number of words. A word is of a predetermined number (e.g., 2) of bytes. A byte is a group of bits (e.g., 8 bits), which can be operated on as a unit. A byte can be considered a unit of memory size.

Alternatively, in a virtualized system with one or more guest operating systems managed by a hypervisor, virtual addresses (VAs) may be translated to intermediate physical addresses (IPAs), which are then translated to physical addresses (PAs). In a virtualized system, the translation by a guest operating system of VAs to IPAs may be handled entirely in software, or the guest operating system may have some hardware assistance from the MMU 300.

The TLB 304 can be used for caching recently accessed PTEs from the page table 308. The caching of recently accessed PTEs can enable the translation to be performed (such as in response to a load or a store instruction) without the page table walker 306 having to perform a potentially multi-level page table walk of a multiple-level data structure storing the page table 308 to retrieve the PTE 310. In an example, the PTE 310 of the page table 308 can store a virtual page number 312 and a physical page number 314, which together serve as a mapping between a VA and a PA that defines a translation of that VA.

An address (i.e., a memory address) can be a collection of bits. The bits of the memory address can be divided into low-order bits and high-order bits. For example, assuming 32-bit addresses, an example of a memory address is 01101001 00101000 00001101 01011100. The low-order bits are the rightmost 16 bits (i.e., 00001101 01011100); and the high-order bit are the leftmost 16 bits (i.e., 01101001 00101000). The low-order bits of a memory address can be used as a page offset. The low-order bits can be identical for a VA and its mapped PA. Thus, the high-order bits of a memory address can be used as a memory page number to specify the mapping.

The PTE 310 can also include status information (SI) 316. The SI 316 can indicate whether or not the page is resident in the main memory 302 or whether the page should be retrieved from secondary storage. When the PTE 310 is stored in an entry of any of the TLB 304, there may also be additional information for managing the transfer of PTEs between the page table 308 and the TLB 304, and for invalidating PTEs in the TLB 304. In an example, invalidating PTEs in the TLB 304 can be accomplished by toggling a bit (that indicates whether the entry is valid or not) to a state (i.e., a binary state) that indicates that the entry is invalid. However, other ways of invalidating PTEs are possible.

If a valid entry in the TLB 304 that matches with a portion of a VA to be translated is found (i.e., a "TLB hit"), then the PTE stored in that entry is used for translation. If there is no match (i.e., a "TLB miss"), then the page table walker 306 can traverse (or "walk") the levels of the page table 308 retrieve a PTE.

The L1 cache 301 can be implemented in any number of possible ways. In the implementation illustrated in FIG. 3, the L1 cache 301 is illustrated as being implemented as an N-way set associative cache module. Each cache entry 320 of the L1 cache 301 can include bits for storing a particular cache block 324 that has been copied from a physical page in the main memory 302 (possibly via higher level cache module).

The cache entry 320 can also include bits for storing a tag 322. The tag 322 can be made up of a number of the most significant bits of a virtual address, which are common to the words of that entry. For a virtually indexed, virtually tagged (VIVT) type of cache module, in addition to comparing a tag portion of a virtual address of desired data, the cache module can compare an index portion of the virtual address (which can be made up of middle bits between the tag and a block offset) to determine which of multiple sets may have a cache entry containing those desired data.

For an N-way set associative cache, the tag comparison can be performed N times (possibly in parallel) for the selected "set" (i). The comparison can be performed once for each of N "ways" in which a cache block containing the desired data may be stored.

The block offset can then be used to select a particular word from a cache block that is found in the cache entry (i.e., a 'cache hit'). If the tag does not match for any of the ways of the selected set (i.e., a 'cache miss'), then the cache system can attempt to retrieve the cache block from a higher level cache or from the main memory 302 (in the case of the LLC). The cache entry 320 can also include bits for storing status information 326. The status information 326 can include, for example, a valid bit and/or any flags or error correction bits and/or a priority requirement.

When establishing a translation from a particular virtual address to a particular physical address or to an intermediate physical address, various types of context information can be used to distinguish otherwise identical virtual addresses from each other. The context information can enable multiple independent virtual address spaces to exist for different processes or different virtual machines or any of a variety of other differentiating characteristics that support different virtual address spaces.

Various portions of the context information can be used for differentiating between virtual addresses that are in use within different VA-to-PA translations, or in the case that intermediate physical addresses (IPAs) are used, VA-to-IPA translations, or IPA-to-PA translations.

For example, an operating system can use an address space identifier (ASID) (e.g., 16 bits) to identify a memory space (a virtual address space) associated with a running process. A hypervisor can use a virtual machine identifier (VMID) (e.g., 16 bits) to identify a memory space (i.e., an intermediate physical address space) associated with a guest operating system of a virtual machine.

Certain parameters can be associated with different classes of processes or software environments that are available in an architecture, such as a security state with values of secure (S) or non-secure (NS), or an exception level (also called a 'priority level') with values of EL0-EL3 (for a 2-bit exception level), for example.

All or a subset of this context information together constitute a context (also called a "translation context" or a "software context") for a particular virtual address.

A context identifier (CID) can represent either the full context information or partial context information. In some architectures, for example, the full context information can include 35 bits: a 2-bit exception level (EL), a 1-bit non-secure/secure (NS/S) value, a 16-bit VMID, and a 16-bit ASID.

It is to be noted, though, that there can potentially be significant overhead in terms of integrated circuit area devoted to the storage for the data structure that tracks validity for different CIDs. To reduce the overhead, the CID can include partial context information, such as only the 16-bit VIVID and the 2-bit EL. Such partial context information can uniquely identify different subsets of contexts. Alternatively, instead of simply concatenating subsets of bits from the full context information, techniques can be used to essentially compress full context information into fewer bits. For example, circuitry that computes the CIDs can be configured to include fewer bits than the full context information, where those bits can be assigned based on a stored mapping between CIDs and a corresponding full context information string.

FIG. 4 is a block diagram of an example of an integrated circuit 400 for executing instructions with cache replacement mechanisms for speculative execution. The integrated circuit 400 includes a processor pipeline 410 configured to access memory through a cache 420. In this example, the cache 420 is an L1 cache and processor pipeline 410 and the cache 420 are parts of a processor core 430. The cache 420 may in turn access memory via one or more higher level caches including an L2 cache 440 that is explicitly shown in FIG. 4. The integrated circuit 400 includes a buffer 450 with entries that are each configured to store a cache line of data and a tag that includes an indication of a status of the cache line stored in the entry, wherein the status can take values from a set that includes speculative, validated, and cancelled. The buffer 450 may be used to temporarily store data accessed via the cache 420 during speculative execution of a load instruction to delay updating of the cache 420 with this data. This may prevent or mitigate some side-channel attacks that seek to use the cache 420.

The integrated circuit 400 includes a processor pipeline 410 configured to access memory through the cache 420. In this example, the cache 420 is an L1 cache of a processor core 430 of the integrated circuit 400 that includes the processor pipeline 410. For example, the processor pipeline 410 may be the pipeline 104. For example, the cache 420 may be the L1 cache 301 of FIG. 3.

The integrated circuit 400 includes a buffer 450 with entries that are each configured to store a cache line of data and a tag that includes an indication of a status of the cache line stored in the entry. The status can take values from a set that includes speculative, validated, and cancelled. For example, the buffer 450 may be a circular buffer and the oldest entry may be overwritten when a new cache line of data is loaded into the buffer. In some implementations, the buffer 450 is a circular buffer and the oldest entry with a status of speculative or cancelled is overwritten when a new cache line of data is loaded into the buffer. In some implementations, the buffer is a fully associative structure. For example, the buffer 450 may be the buffer 500 of FIG. 5.

The integrated circuit 400 is configured to, responsive to a cache miss caused by a load instruction that is speculatively executed by the processor pipeline 410, load a cache line of data corresponding to the cache miss into an entry of the buffer 450 and update the tag of the entry to indicate the status is speculative. The integrated circuit 400 is configured to, responsive to the load instruction being retired by the processor pipeline 410, update the tag of the entry to indicate the status is validated. The integrated circuit 400 is configured to, responsive to the load instruction being flushed from the processor pipeline 410, update the tag of the entry to indicate the status is cancelled. For example, the integrated circuit 400 may be configured to prevent updating of the cache 420 based on cache misses caused by load instructions that are speculatively executed by the processor pipeline 410 before the load instructions have been retired. In some implementations, a context switch by the processor core 430 may cause all entries marked as speculative to be cancelled. For example, the integrated circuit 400 may configured to, responsive to a context switch for software being executed using the processor pipeline 410, change the status of entries in the buffer 450 from speculative to cancelled. For example, integrated circuit 400 may include circuitry configured to implement the technique 600 of FIG. 6.

In some applications, only certain types of data and instructions are considered sensitive in a manner that justifies security measures. In such cases, certain types of load instructions may be permitted to speculatively update the cache 420, bypassing the buffer 450. For example, the load instruction that causes an update to the buffer 450 may an integer load instruction and the integrated circuit 400 may be configured to allow floating point load instructions to update the cache 420 while they are being speculatively executed by the processor pipeline 410. In some implementations, low priority processes or contexts may be allowed to speculatively update the cache 420 to improve performance. For example, the load instruction that causes an update to the buffer 450 may be executed in a context with a high priority level and the integrated circuit 400 may be configured to allow load instructions to update the cache 420 while they are being speculatively executed by the processor pipeline 410 in a context with a lowest priority level.

The integrated circuit 400 may be configured to, responsive to a second load instruction, check the cache 420 and the buffer 450 to determine if data referenced by the second load instruction is stored in the cache 420 or the buffer 450. The integrated circuit 400 may be configured to, responsive to data referenced by the second load instruction being absent from the cache 420 and being found in a second entry of the buffer 450, check the tag of the second entry to determine the status. The integrated circuit 400 may be configured to, responsive to the status of the second entry being speculative or validated, load the data referenced by the second load instruction to the processor pipeline 410 from the buffer 450. The integrated circuit 400 may be configured to, responsive to the status of the second entry being cancelled, invoke a cache miss. Invoking a cache miss may in turn cause a cache line of data to be retrieved from an outer memory system and stored in the buffer 450 for use by the second load instruction. For example, integrated circuit 400 may include circuitry configured to implement the technique 700 of FIG. 7.

The integrated circuit 400 may be configured to search the buffer 450 for entries for which the status is validated. The integrated circuit 400 may be configured to, responsive to finding the status of the first entry is validated, move the cache line of data stored by the first entry into the cache 420. For example, this search may be performed periodically (once per second or once per ten seconds) to move validated data into the cache 420. For example, integrated circuit 400 may include circuitry configured to implement the technique 800 of FIG. 8.

FIG. 5 is a block diagram of an example of a buffer 500 for storing cache lines of data during speculative execution to delay updates to a cache. The buffer 500 includes entries 520, 522, 524, 526, and 528 that are each configured to store a cache line of data (540, 542, 544, 546, and 548 respectively) and a tag (560, 562, 564, 566, and 568 respectively) that includes an indication of a status (580, 582, 584, 586, and 588 respectively) of the cache line stored in the entry. The status of an entry (520, 522, 524, 526, or 528) can take values from a set that includes speculative, validated, and cancelled. For example, a cache line of data 540 may be loaded into the entry 520 in response to the speculative execution of a load instruction that references the cache line of data 540. When it the data is first loaded into the buffer 500 its is marked as speculative by updating the indication of status 580 for the entry 520. The status of the entry 520 may remain speculative until a processor pipeline executing the load instruction determines whether the load instruction has been properly executed. If the load instruction is successfully retired, then the status of the entry 520 may be changed to validated by updating the indication of status 580 for the entry 520. Cache line data from validated entries may be moved to a corresponding cache (e.g., the cache 420) for longer term storage. If the load instruction is determined to have resulted from a misprediction and is flushed from the processor pipeline, then the status of the entry 520 may be changed to cancelled by updating the indication of status 580 for the entry 520. Cancelled entries may be subject to deletion or release and overwritten with new data. Unlike entries with the status speculative or validated, entries with the status cancelled are unavailable for access by the processor pipeline. An attempt to access data stored in an entry marked as cancelled may result in the invocation of a cache miss.

The buffer 500 may have more than the five entries explicitly shown in FIG. 5. For example, the buffer may have 32 entries or 64 entries. For example, the buffer 500 may be a circular buffer and the oldest entry may be overwritten when a new cache line of data is loaded into the buffer. In some implementations, the buffer 500 is a circular buffer and the oldest entry with a status of speculative or cancelled is overwritten when a new cache line of data is loaded into the buffer. In some implementations, the buffer is a fully associative structure. In some implementations, the buffer 500 may be a line fill buffer.

For example, the indication of a status 580 for the entry 520 may be stored in bits of the tag 560. The tag 560 may include additional data that facilitates the association of the cache line data 540 with a location memory (e.g., with a physical or virtual address of the external memory system 113). An integrated circuit (e.g., the integrated circuit 400) may include circuitry with logic configured to implement the technique 600, the technique 700, and/or the technique 800 to update the state of the buffer 500 and a paired cache (e.g., the cache 420).

Figure 6:
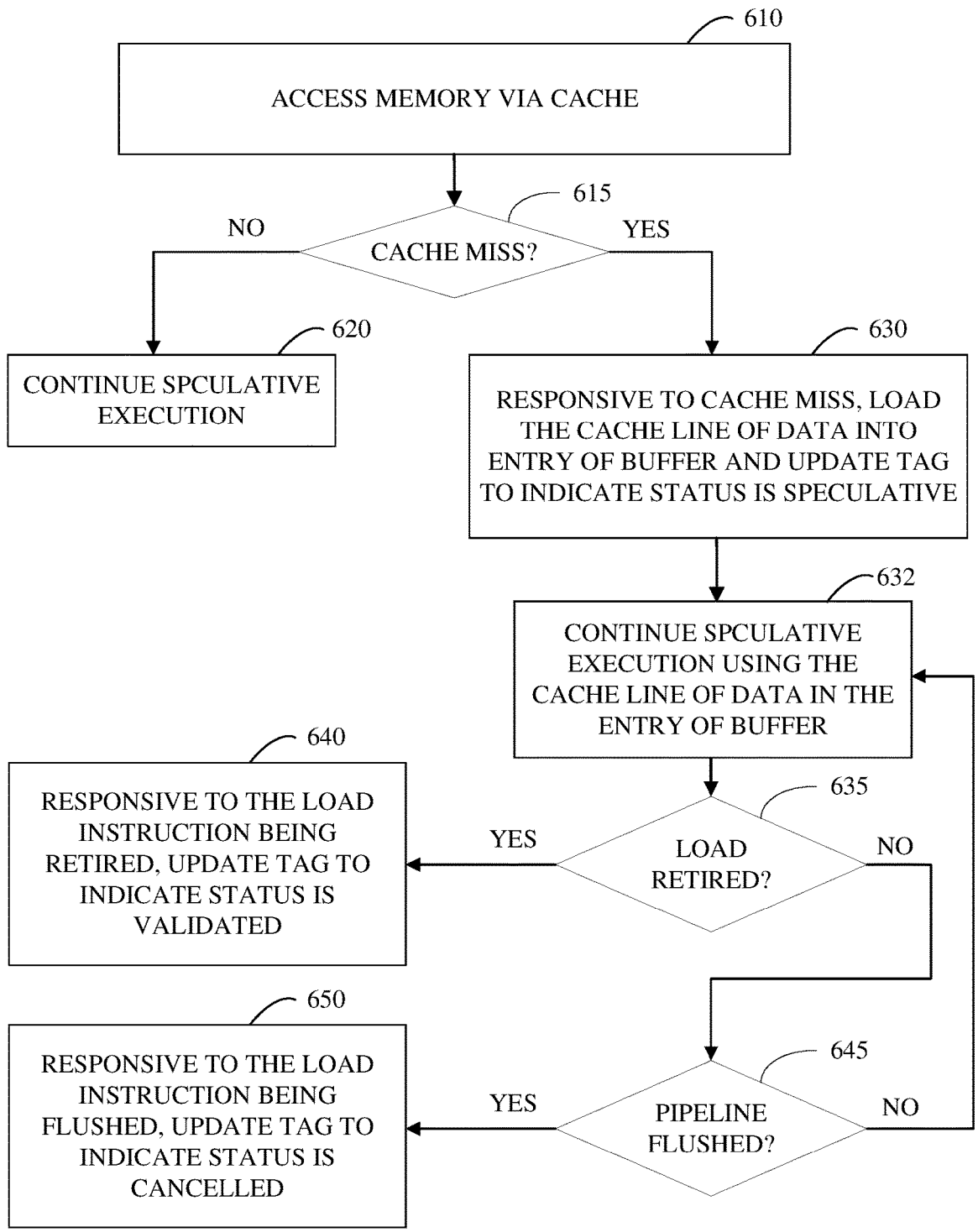
FIG. 6 is a flow chart of an example of a technique for executing a load instruction with cache replacement mechanisms for speculative execution.

FIG. 6 is a flow chart of an example of a technique 600 for executing a load instruction with cache replacement mechanisms for speculative execution. The technique 600 includes accessing memory via a cache; if (at step 615) there is no cache miss, then continuing 620 speculative execution; if (at step 615) there is a cache miss, then, responsive to the cache miss, loading 630 a cache line of data corresponding to the cache miss into a first entry of a buffer and updating a tag of the first entry to indicate a status is speculative; continuing 632 speculative execution using the cache line of data in the entry of the buffer until; if (at step 635) the load instruction is retired, then, responsive to the load instruction being retired, updating 640 the tag of the first entry to indicate the status is validated; or if (at step 645) the load instruction is flushed from the processor pipeline, then, responsive to the load instruction being flushed, updating 650 the tag of the first entry to indicate the status is cancelled. For example, the technique 600 may be implemented using the integrated circuit 101 of FIG. 1. For example, the technique 600 may be implemented using the integrated circuit 400 of FIG. 4.

The technique 600 includes accessing 610 memory via a cache (e.g., the cache 420). A load instruction that is being speculatively executed by a processor pipeline (e.g., the processor pipeline 410) attempts to access 610 data stored in memory. Accessing 610 memory includes checking if the referenced data is already available in the cache. Accessing 610 memory may also include checking if the referenced data is already available in a buffer (e.g., the buffer 450) that stores data for speculatively executing instructions. If the referenced data is not locally available, then a cache miss occurs. For example, accessing 610 memory via the cache may include implementing the technique 700 of FIG. 7.

If (at step 615) there is no cache miss, then the technique 600 includes continuing 620 speculative execution using the available copy of the referenced data. If (at step 615) there is a cache miss, then the technique 600 includes, responsive to the cache miss caused by the load instruction that is speculatively executed by a processor pipeline (e.g., the processor pipeline 410), loading 630 a cache line of data corresponding to the cache miss into a first entry of a buffer (e.g., the buffer 450) and updating a tag of the first entry to indicate a status is speculative. For example, the technique 600 may prevent updating of the cache based on cache misses caused by load instructions that are speculatively executed by the processor pipeline before the load instructions have been retired.

The technique 600 includes continuing 632 speculative execution using this retrieved cache line of data that is stored in the first entry of the buffer. Speculative execution may continue 632 until the load instruction is retired and its results are committed to the architectural state or the load instruction is flushed from the processor pipeline (e.g., when it is found to have been fetched as the result of a misprediction by the processor pipeline).

If (at step 635) the load instruction is retired, then, responsive to the load instruction being retired by the processor pipeline, updating 640 the tag of the first entry to indicate the status is validated. Cache line data in validated entries may be moved to the cache (e.g., the cache 420) for longer term storage and to free up the entry in the buffer. In some implementations, an asynchronous system periodically walks the buffer to move validated entries to the cache. For example, technique 800 of FIG. 8 may be implemented to move validated entries from the buffer to the cache.

If (at step 645) the load instruction is flushed from the pipeline, then, responsive to the load instruction being flushed from the processor pipeline, updating 650 the tag of the first entry to indicate the status is cancelled. In some implementations, a context switch by a processor core including the processor pipeline may cause all entries in the buffer marked as speculative to be cancelled. For example, the technique 600 may include, responsive to a context switch for software being executed using the processor pipeline, changing the status of entries in the buffer from speculative to cancelled.

Cache lines of data stored in the buffer may be accessible to the processor pipeline while the status of their entry is speculative or validated, and cache lines of data stored in the buffer may be rendered inaccessible to the processor pipeline when the status of their entry is cancelled. For example, the technique 700 of FIG. 7 may be implemented to check the buffer and the cache for referenced data when accessing 610 memory.

Figure 7:
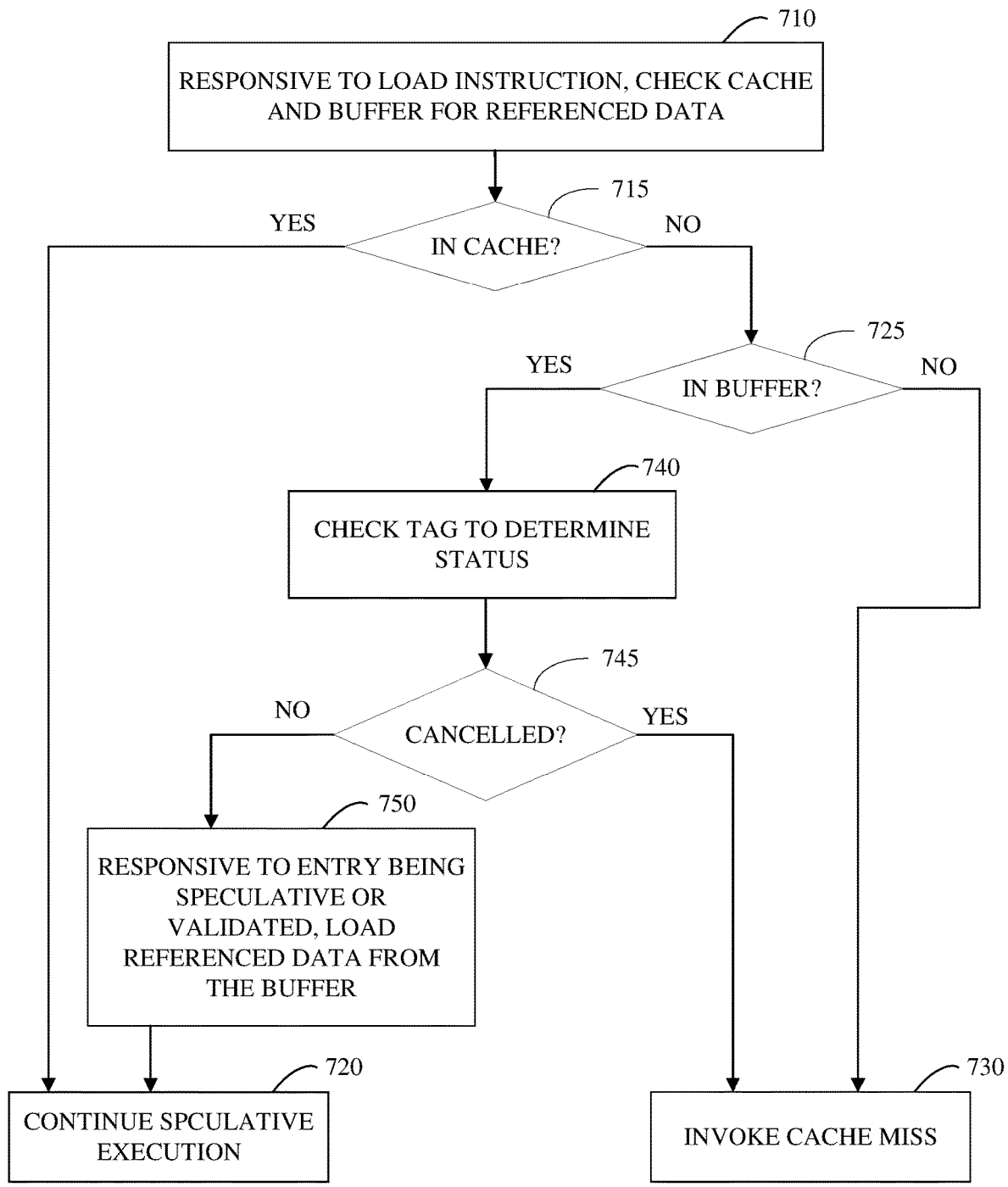
FIG. 7 is a flow chart of an example of a technique for accessing memory via a cache with cache replacement mechanisms for speculative execution.

FIG. 7 is a flow chart of an example of a technique 700 for accessing memory via a cache with cache replacement mechanisms for speculative execution. The technique 700 includes, responsive to a load instruction, checking 710 a cache (e.g., the cache 420) and a buffer (e.g., the buffer 450) to determine if data referenced by the load instruction is stored in the cache or the buffer; if (at step 715) the referenced data is available in the cache, then continuing 720 speculative execution using the available data; if (at step 715) is not available in the cache, then if (at step 725) the referenced data is not stored in the buffer, then invoking 730 a cache miss; if (at step 725) the referenced data is stored in the buffer, then, responsive to data referenced by the load instruction being absent from the cache and being found in an entry of the buffer, checking 740 a tag of the entry to determine the status; if (at step 745) the status of the buffer entry is not cancelled, then, responsive to the status of the second entry being speculative or validated, loading 750 the data referenced by the load instruction to the processor pipeline from the buffer before continuing 720 speculative execution; and if (at step 745) the status of the buffer entry is cancelled, then, responsive to the status of the second entry being cancelled, invoking 730 a cache miss. For example, invoking 730 a cache miss may cause the referenced data to be retrieved from an external memory system (e.g., the external memory system 113) and stored in an entry of the buffer. For example, the technique 700 may be implemented using the integrated circuit 101 of FIG. 1. For example, the technique 700 may be implemented using the integrated circuit 400 of FIG. 4.

Figure 8:
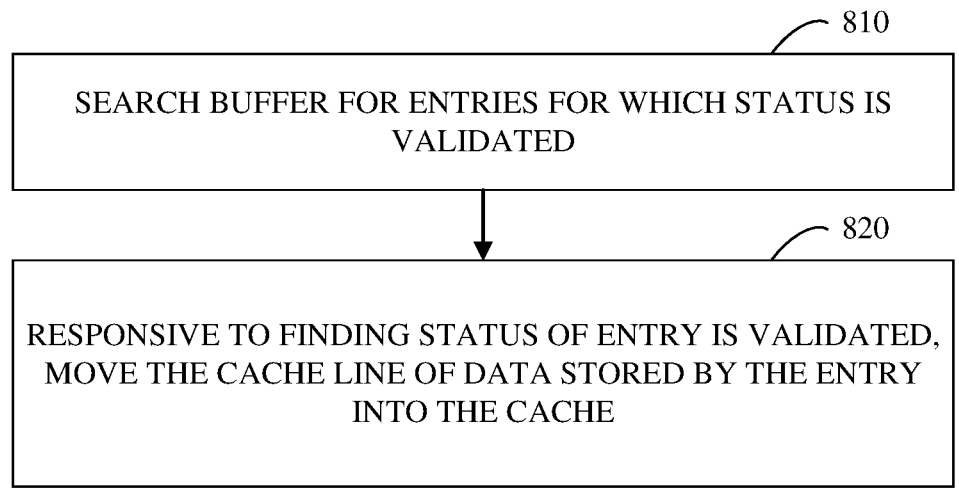
FIG. 8 is a flow chart of an example of a technique for updating a cache after speculative execution.

FIG. 8 is a flow chart of an example of a technique 800 for updating a cache after speculative execution. The technique 800 includes searching 810 a buffer (e.g., the buffer 450) for entries for which the status is validated; and, responsive to finding the status of an entry is validated, moving 820 the cache line of data stored by the entry into a cache (e.g., the cache 420). For example, the technique 800 may implemented periodically to walk the buffer and move 820 data for validated entries to the cache for longer term storage. Moving 820 the data to the cache may improve performance of the processor pipeline and free up the entry of the buffer for reuse. An entry of the buffer for which the validated cache line data has been moved to the cache may have its status changed to cancelled or be deleted and/or released for reuse by some other means. For example, the technique 600 may be implemented using the integrated circuit 101 of FIG. 1. For example, the technique 600 may be implemented using the integrated circuit 400 of FIG. 4.

For simplicity of explanation, the techniques 600, 700, and 800 are each depicted and described as a series of blocks, steps, or operations. However, the blocks, steps, or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

Implementations of the integrated circuit 400 (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

Further, all or a portion of implementations of this disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described implementations and other aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. An integrated circuit for executing instructions, comprising:
   a processor pipeline configured to access memory through a cache; and
   a buffer comprising entries that are each configured to store a cache line of data and a tag that includes an indication of a status of the cache line stored in the entry, wherein the status can take values from a set that includes speculative, validated, and cancelled;
   in which the integrated circuit is configured to:
   responsive to a cache miss caused by a first load instruction that is speculatively executed by the processor pipeline, load a cache line of data corresponding to the cache miss into a first entry of the buffer and update the tag of the first entry to indicate the status is speculative;
   responsive to the first load instruction being retired by the processor pipeline, update the tag of the first entry to indicate the status is validated;
   responsive to the first load instruction being flushed from the processor pipeline, update the tag of the first entry to indicate the status is cancelled; and
   asynchronously from updating the tag of any particular entry to indicate the status is validated, searching the buffer for a plurality of entries for which the status is validated and moving corresponding cache lines of data stored by the plurality of entries into the cache.

2. The integrated circuit of claim 1, in which the integrated circuit is configured to:
   responsive to a second load instruction, check the cache and the buffer to determine if data referenced by the second load instruction is stored in the cache or the buffer;
   responsive to data referenced by the second load instruction being absent from the cache and being found in a second entry of the buffer, check the tag of the second entry to determine the status;
   responsive to the status of the second entry being speculative or validated, load the data referenced by the second load instruction to the processor pipeline from the buffer; and
   responsive to the status of the second entry being cancelled, invoke a cache miss.

3. The integrated circuit of claim 1, in which the integrated circuit is configured to:
   responsive to a context switch for software being executed using the processor pipeline, change the status of entries in the buffer from speculative to cancelled.

4. The integrated circuit of claim 1, in which the integrated circuit is configured to prevent updating of the cache based on cache misses caused by load instructions that are speculatively executed by the processor pipeline before the load instructions have been retired.

5. The integrated circuit of claim 1, in which the buffer is a fully associative structure.

6. The integrated circuit of claim 1, in which the buffer is a circular buffer and the oldest entry is overwritten when a new cache line of data is loaded into the buffer.

7. The integrated circuit of claim 1, in which the buffer is a circular buffer and the oldest entry with a status of speculative or cancelled is overwritten when a new cache line of data is loaded into the buffer.

8. The integrated circuit of claim 1, in which the first load instruction is an integer load instruction and the integrated circuit is configured to allow floating point load instructions to update the cache while they are being speculatively executed by the processor pipeline.

9. The integrated circuit of claim 1, in which the first load instruction is executed in a context with a high priority level and the integrated circuit is configured to allow load instructions to update the cache while they are being speculatively executed by the processor pipeline in a context with a lowest priority level.

10. The integrated circuit of claim 1, in which the cache is an L1 cache of a processor core of the integrated circuit that includes the processor pipeline.

11. A method comprising:
responsive to a cache miss in a cache caused by a first load instruction that is speculatively executed by a processor pipeline, loading a cache line of data corresponding to the cache miss into a first entry of a buffer and updating a tag of the first entry to indicate a status is speculative;
responsive to the first load instruction being retired by the processor pipeline, updating the tag of the first entry to indicate the status is validated; and
asynchronously from updating the tag of any particular entry to indicate the status is validated, searching the buffer for a plurality of entries for which the status is validated and moving corresponding cache lines of data stored by the plurality of entries into the cache.

12. The method of claim 11, comprising:
responsive to a second load instruction, checking the cache and the buffer to determine if data referenced by the second load instruction is stored in the cache or the buffer;
responsive to data referenced by the second load instruction being absent from the cache and being found in a second entry of the buffer, checking the tag of the second entry to determine the status; and
responsive to the status of the second entry being speculative or validated, loading the data referenced by the second load instruction to the processor pipeline from the buffer.

13. The method of claim 11, comprising:
responsive to a context switch for software being executed using the processor pipeline, changing the status of entries in the buffer from speculative to cancelled.

14. The method of claim 11, comprising:
preventing updating of the cache based on cache misses caused by load instructions that are speculatively executed by the processor pipeline before the load instructions have been retired.

15. A method comprising:
responsive to a cache miss in a cache caused by a first load instruction that is speculatively executed by a processor pipeline, loading a cache line of data corresponding to the cache miss into a first entry of a buffer and updating a tag of the first entry to indicate a status is speculative;
responsive to the first load instruction being flushed from the processor pipeline, updating the tag of the first entry to indicate the status is cancelled, or responsive to the first load instruction being retired by the processor pipeline, updating the tag of the first entry to indicate the status is validated; and
asynchronously from updating the tag of any particular entry responsive to a flushing or a retiring of any particular instruction, searching the buffer for a plurality of entries for which the status is validated and moving corresponding cache lines of data stored by the plurality of entries into the cache.

16. The method of claim 15, comprising:
responsive to a second load instruction, checking the cache and the buffer to determine if data referenced by the second load instruction is stored in the cache or the buffer;
responsive to data referenced by the second load instruction being absent from the cache and being found in a second entry of the buffer, checking the tag of the second entry to determine the status; and
responsive to the status of the second entry being cancelled, invoking a cache miss.

17. The method of claim 15, comprising:
responsive to a context switch for software being executed using the processor pipeline, changing the status of entries in the buffer from speculative to cancelled.

18. The method of claim 15, comprising:
preventing updating of the cache based on cache misses caused by load instructions that are speculatively executed by the processor pipeline before the load instructions have been retired.

19. An integrated circuit for executing instructions, comprising:
means for caching data to provide access to a memory;
means for processing data, including accessing the memory from a processor pipeline through the means for caching data; and
means for buffering data in a plurality of entries that are each configured to store a cache line of data and a tag that includes an indication of a status of the cache line stored in the entry, wherein the status can take values from a set that includes speculative, validated, and cancelled;
in which the processing comprises:
responsive to a cache miss caused by a first load instruction that is speculatively executed by the processor pipeline, loading a cache line of data corresponding to the cache miss into a first entry of the plurality of entries and updating the tag of the first entry to indicate the status is speculative;
responsive to the first load instruction being retired by the processor pipeline, updating the tag of the first entry to indicate the status is validated;
responsive to the first load instruction being flushed from the processor pipeline, updating the tag of the first entry to indicate the status is cancelled;
asynchronously from updating the tag of any particular entry to indicate the status is validated, searching the buffer for a plurality of entries for which the status is validated and moving corresponding cache lines of data stored by the plurality of entries into the means for caching data.

* * * * *